United States Patent
Cortez et al.

(10) Patent No.: US 10,870,795 B2
(45) Date of Patent: Dec. 22, 2020

(54) RHEOLOGY MODIFIER

(71) Applicant: Halliburton Energy Services, Inc., Houston, TX (US)

(72) Inventors: Janette Cortez, Kingwood, TX (US); Dipti Singh, Kingwood, TX (US); Ubong Inyang, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 354 days.

(21) Appl. No.: 15/749,027

(22) PCT Filed: Oct. 15, 2015

(86) PCT No.: PCT/US2015/055801
§ 371 (c)(1),
(2) Date: Jan. 30, 2018

(87) PCT Pub. No.: WO2017/065781
PCT Pub. Date: Apr. 20, 2017

(65) Prior Publication Data
US 2019/0002757 A1  Jan. 3, 2019

(51) Int. Cl.
*C09K 8/512* (2006.01)
*C09K 8/88* (2006.01)
*C09K 8/514* (2006.01)
*C09K 8/516* (2006.01)
*C09K 8/90* (2006.01)
*C09K 8/92* (2006.01)

(52) U.S. Cl.
CPC .............. *C09K 8/887* (2013.01); *C09K 8/512* (2013.01); *C09K 8/514* (2013.01); *C09K 8/516* (2013.01); *C09K 8/90* (2013.01); *C09K 8/92* (2013.01); *C09K 2208/24* (2013.01); *C09K 2208/26* (2013.01)

(58) Field of Classification Search
CPC ...... C09K 8/516; C09K 8/80; C09K 2208/08; C09K 2208/26; C09K 8/08; C09K 8/426; C09K 8/5045; C09K 8/508; C09K 8/512; C09K 8/52; C09K 8/62; C09K 8/887; C09K 8/90; C09K 8/92; C09K 2208/24; C09K 2208/30; C09K 8/035; C09K 8/12; C09K 8/44; C09K 8/467; C09K 8/48; C09K 8/514; C09K 8/536; C09K 8/54; C09K 8/602; C09K 8/66; C09K 8/70; C09K 8/72; C09K 8/76; C09K 8/882; E21B 43/267; E21B 21/08; E21B 43/34; E21B 44/00; E21B 44/02; E21B 47/10; E21B 21/003; E21B 29/00; E21B 33/03; E21B 33/035; E21B 33/1208; E21B 33/13; E21B 33/16; E21B 36/001; E21B 37/00; E21B 37/06; E21B 43/26

See application file for complete search history.

(56) References Cited

U.S. PATENT DOCUMENTS

| | | |
|---|---|---|
| 3,155,162 A | 11/1964 | Flickinger et al. |
| 3,399,727 A | 9/1968 | Graham et al. |
| 4,493,875 A | 1/1985 | Beck et al. |
| 4,767,726 A | 8/1988 | Marshall |
| 6,703,352 B2 | 3/2004 | Dahayanake et al. |
| 7,044,220 B2 | 5/2006 | Nguyen et al. |
| 7,482,310 B1* | 1/2009 | Reese ............ C09K 8/64 166/270 |
| 7,699,106 B2 | 4/2010 | Brannon et al. |
| 7,845,409 B2 | 12/2010 | Shinbach et al. |
| 8,522,874 B2 | 9/2013 | Reddy et al. |
| 8,853,135 B2 | 10/2014 | Phatak et al. |
| 2004/0033905 A1 | 2/2004 | Shinbach et al. |
| 2006/0089265 A1 | 4/2006 | Hanes, Jr. et al. |
| 2006/0234872 A1 | 10/2006 | Mirakyan et al. |
| 2009/0149353 A1* | 6/2009 | Dajani ............ C09K 8/08 507/216 |
| 2009/0205829 A1 | 8/2009 | Sullivan et al. |
| 2010/0025615 A1 | 2/2010 | Lo et al. |
| 2011/0053812 A1 | 3/2011 | Ezell et al. |
| 2013/0153233 A1 | 6/2013 | Bell et al. |
| 2013/0333888 A1* | 12/2013 | Rincon-Torres ...... C09K 8/685 166/279 |
| 2014/0048272 A1* | 2/2014 | Tang ............ C09K 8/66 166/308.5 |
| 2015/0013983 A1* | 1/2015 | Alwattari ............ C09K 8/62 166/300 |

FOREIGN PATENT DOCUMENTS

WO    2012061241 A2    5/2012

OTHER PUBLICATIONS

3M Glass Bubbles HGS Series, brochure pubished by 3M Advanced Materials Division, St. Paul, MN, date unknown.

* cited by examiner

*Primary Examiner* — Kumar R Bhushan
(74) *Attorney, Agent, or Firm* — McAfee & Taft

(57) ABSTRACT

The composition provided herein includes an aqueous base fluid, a water-based polymer and glass microspheres comprising a metal cross-linking agent and where the water-based polymer cross-links in the presence of the glass microspheres.

20 Claims, 2 Drawing Sheets

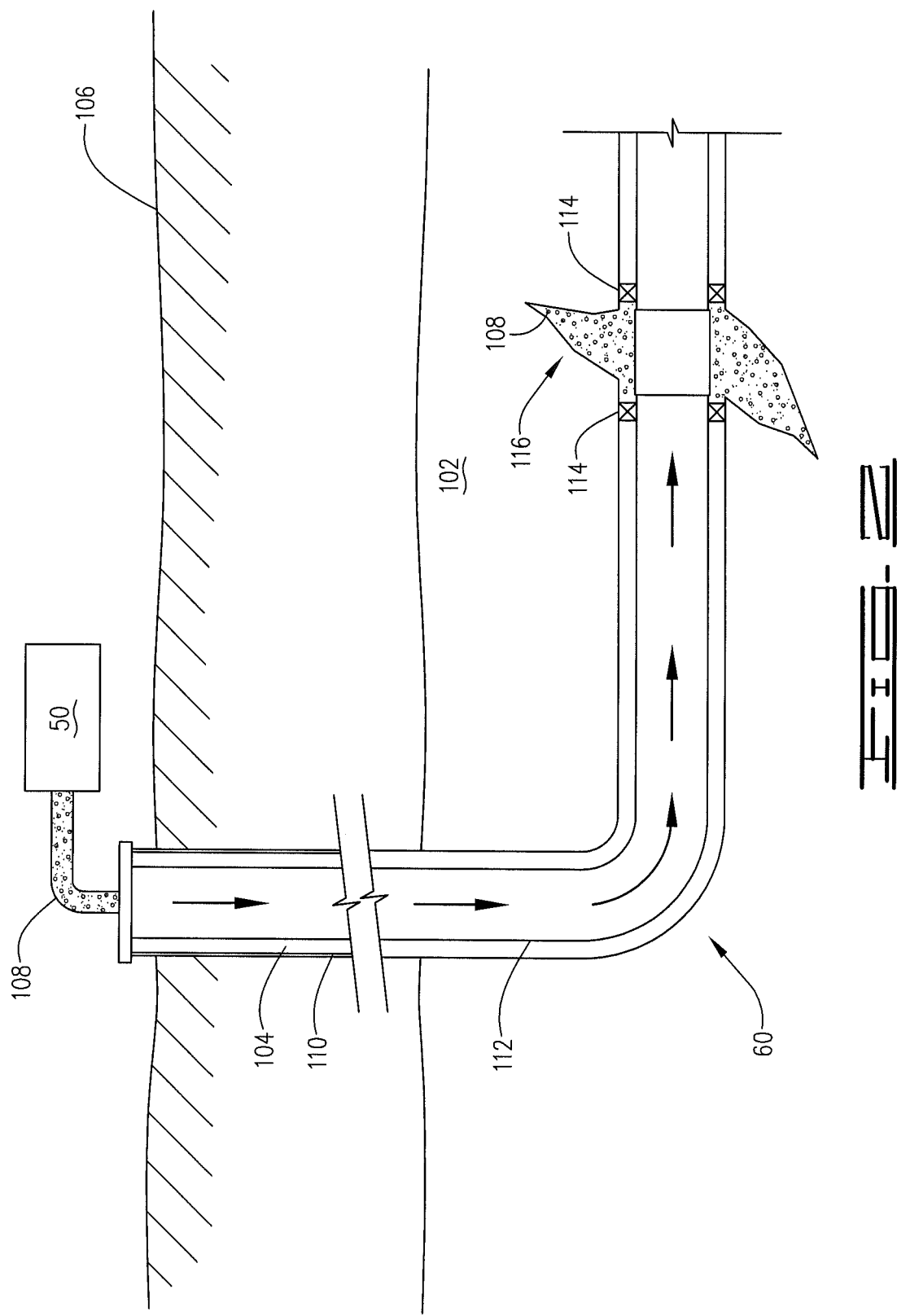

RHEOLOGY MODIFIER

FIELD

The present invention relates generally to methods and compositions that may be useful in treating subterranean formations, and more specifically to methods and compositions for modifying the rheology of fluids.

BACKGROUND

The upstream energy industry uses treatment fluids in a variety of production and stimulation operations. For example, a treatment fluid may be used to drill a borehole in a subterranean formation, to stimulate a wellbore in a subterranean formation, control or prevent the passage of fluid through a portion of a subterranean formation, control or prevent the production of an undesirable fluid through a wellbore, and/or isolate specific areas in a wellbore or zones in a subterranean formation.

Many operations require the rheology of a treatment fluid to be modified either sometime before the fluid enters a desired portion of a formation or after. For example, in fracturing operations, treatment fluids may contain a gelling agent that increases the viscosity of the fluid to prevent the loss of fluid as the fluid enters into porous portions of the formation. Fluid loss effects fracture size and geometry, thus, increasing the viscosity of the fluid before the fluid enters the desired portion of the formation will enhance the fluid's efficiency and effectiveness during fracturing operations.

Modifying the rheology of a fluid before the fluid is pumped into a specified portion of a formation also aids in transporting and depositing proppant into the formation. For example, to accomplish the placement of the proppant inside a fracture, the proppant is suspended in a fluid that is pumped to a desired portion of the formation. Typically, to suspend a proppant in a fluid, the viscosity of the fluid must be increased. The suspended proppant in the fluid can then be deposited in a fracture to hold the fractures open and enhance hydrocarbon production.

Treatment fluids that act as a diverter and/or sealer require rheology of a treatment fluid to be modified after the fluid is pumped into a specified portion of the formation. After the fluid is pumped into a certain portion of the formation, the fluid forms a gel and physically blocks fluid flow to divert another fluid to a more desirable location in the formation. In other operations, the treatment fluid may form a gel to seal, either permanently or temporarily, a portion of the formation to seal off, for example, undesirable water production. Using treatment fluids as diverters and/or sealers increases and facilitates hydrocarbon production.

Therefore, there is a need for rheology modifiers that may be used in various production and stimulation operations either before or after the treatment fluid is pumped into the formation.

BRIEF DESCRIPTION OF THE DRAWINGS

Implementations of the present technology will now be described, by way of example only, with reference to the attached figures, wherein:

FIG. 2 is a schematic illustration of an example of a subterranean formation prepared for formation conditioning operations in accordance with certain embodiments of the present disclosure.

DETAILED DESCRIPTION

Figure 1:
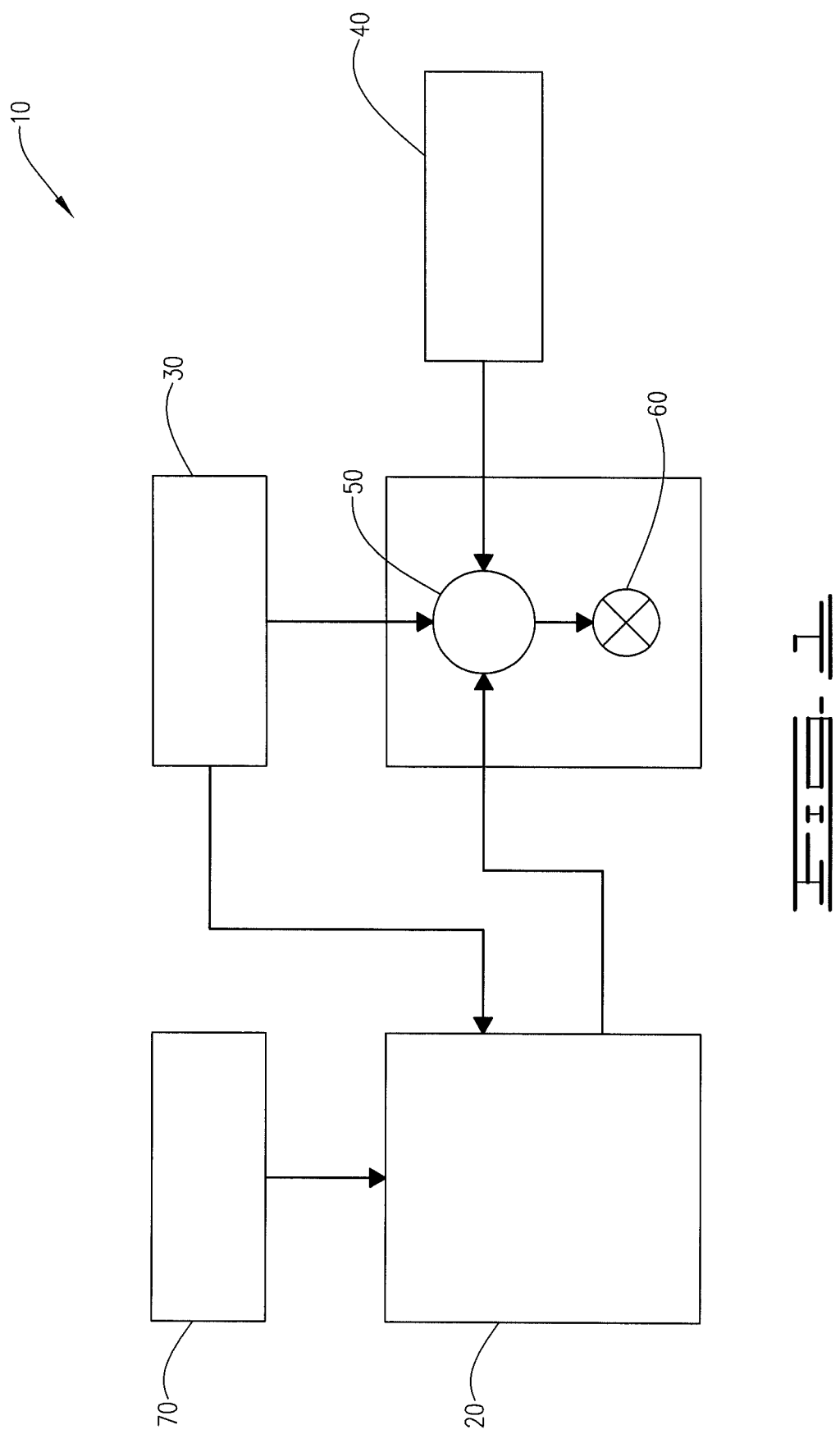
FIG. 1 is a schematic diagram illustrating an example of a system that may be used in accordance with certain embodiments of the present disclosure.

The present disclosure may be understood more readily by reference to the following detailed description as well as to the examples included therein. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The figures are not necessarily to scale and the proportions of certain parts have been exaggerated to better illustrate details and features of the present disclosure.

Of the many advantages of the present disclosure, the methods and compositions disclosed herein provide a rheology modifier that may be used in various production and stimulation operations, either before or after the treatment fluid is pumped into the formation, including: preventing undesired fluid leak-off; transporting and depositing proppant; and permanently or temporarily sealing off undesirable water production.

As used herein, "subterranean formation" or "formation" refers to the fundamental unit of lithostratigraphy. A subterranean formation is a body of rock that is sufficiently distinctive and continuous that it can be mapped. In the context of formation evaluation, the term refers to the volume of rock observable by measurement through, among other ways, log testing or well testing. These measurements indicate the physical properties of the rock, such as permeability.

As used herein, a "well" includes a wellbore and the near-wellbore region of rock surrounding the wellbore. As may be used herein, "into a well" means and includes into any portion of the well, including into the wellbore of the well or into a near-wellbore region of a subterranean formation along a wellbore.

As used herein, a "treatment fluid" or "fluid" refers to a fluid used in a treatment of a well or subterranean formation. A treatment fluid is typically adapted to be used to achieve a specific treatment purpose, such as stimulation, isolation, conformance control or diversion, however, the word treatment in the term treatment fluid does not necessarily imply any particular action by the fluid.

As used herein, "composition" refers to an aqueous base fluid, a water-based polymer and glass microspheres comprising a metal cross-linking agent, wherein the water-based polymer cross-links in the presence of the glass microspheres. While not wishing to be bound by any particular theory, it is believed that the water-based polymer cross-links with the surfaces of the glass microspheres forming bonds (or cross-links) between the water-based polymer and the glass microspheres' surfaces.

As used herein, an "aqueous base fluid" refers to aqueous fluid that, preferably, does not adversely interact with the other components used in accordance with this invention or with the subterranean formation. Suitable aqueous base fluids include fresh water, saltwater, brine, formation brine and seawater. In some embodiments, the aqueous base fluid may be present in the composition in an amount in the range from about 5% to about 99%, about 40% to about 99%, about 50% to about 99%, about 60% to about 99%, about 70% to about 99% or about 80% to about 99% by volume of the composition.

As used herein, a "water-based polymer" refers to a polymer that, under the appropriate conditions (e.g., mixing, time, and temperature), forms a cross-linked gel with the metal cross-linking agent of the glass microspheres. A "cross-linked gel" or "gel" refers to a semi-rigid, jelly-like mass formed when the water-based polymer and metal cross-linking agent of the glass microspheres combine through a cross-linking reaction.

Water-based polymers are natural biodegradable polymers. For example, a water-based polymer includes guar gum and derivatives thereof, such as hydropropyl guar (HPG), carboxymethyl guar (CMG), carboxymethylhydropropyl guar (CMHPG) and hydroxyethylated guar (HEG). Water-based polymers also include cellulose derivatives, for example, hydroxyethylcellulose (HEC), hydroxypropylcellulose (HPC), carboxymethyl cellulose (CMC) and carboxymethylhydroxyethylcellulose (CMHEC).

Typically, the concentration of water-based polymer in the aqueous base fluid will depend on the desired viscosity. Often such concentrations are from about 5 lb/1000 gal of aqueous fluid to about 100 lb/1000 gal of aqueous fluid. More preferably, the concentrations are from about 20 lb/1000 gal of aqueous fluid to about 75 lb/1000 gal of aqueous fluid. Even more preferably, the concentrations are from about 25 lb/1000 gal of aqueous fluid to about 50 lb/1000 gal of aqueous fluid.

As used herein, a "glass microsphere" is a microscopic sphere made of glass with certain physical and chemical properties for use in the present invention, including collapse strength, size, density and most importantly, cross-linking compatibility with the water-based polymer. The glass microspheres used in the present disclosure are uncoated (e.g. free of polymeric resins, or other resin/binders that interfere with the cross-linking between the water-based polymer and glass microsphere's surface, including thermoplastic polymers and thermoset polymers). The glass microspheres may also be solid or hollow.

Glass microspheres of the present disclosure are usually between about 1 to about 1000 microns in diameter, preferably from about 5 to 500 microns, and even more preferably about 10 to about 100 microns in diameter. The glass microspheres may have a density of about 0.2 g/cc to about 1.5 g/cc, more typically the density can be about 0.2 g/cc to about 1.0 g/cc, and even more typically the density can be about 0.3 g/cc to about 0.6 g/cc. The isostatic collapse strength of the glass microspheres can be about 1000 psi or greater, in some embodiments it can be about 5,000 psi or greater, in other embodiments it can be 10,000 psi or greater, and in still other embodiments it can be 15,000 psi or greater. At relatively shallow depths, the collapse strength of the glass microspheres does not have to be high, but at deeper depths the pressure exerted on the glass microspheres increases and the microspheres should be selectively chosen to withstand the pressure.

In order for the glass microspheres to have cross-linking compatibility with the water-based polymer, the chemical composition of the glass microsphere can include a metal cross-linking agent in sufficient amount such that cross-linking occurs. As used herein, a "metal cross-linking agent" is a metal ion that reacts with the water-based polymer to chemically link by covalent bonds the polymer molecules, which helps increase the viscosity of the composition. The term "cross-linking" refers to a comparatively short connecting unit (as in a chemical bond or chemically bonded group) formed between metal cross-linking agents and water-based polymers.

Examples of suitable metal cross-linking agents include, but are not limited to, boron compounds; zirconium compounds; titanium compounds; aluminum compounds; antimony compounds; chromium compounds; iron compounds; copper compounds; zinc compounds; or a combination thereof.

Typically, the compounds mentioned above contain at least one oxygen atom. For example, part of the aluminum compound can be oxygen forming aluminum oxide ($Al_2O_3$). In another example, the boron compound can contain oxygen forming boric oxide ($B_2O_3$). Other suitable oxides include titanium oxide, zirconium oxide, antimony oxide, chromium oxide, iron oxide, copper oxide and zinc oxide.

In some embodiments, the composition includes a metal cross-linking agent selected from the group consisting of aluminum oxide, boric oxide, titanium oxide, zirconium oxide, antimony oxide, chromium oxide, iron oxide, copper oxide and zinc oxide.

The metal cross-linking agent forms a part of the glass microspheres' chemical composition. The suitable amount of metal cross-linking agent required in the chemical composition can be anywhere from about 3% to about 25% of the total chemical composition of a glass microsphere. In other embodiments, the amount of metal cross-linking agent in the glass microspheres' chemical composition can be from about 5% to about 20% of the total chemical composition of a glass microsphere. In still other embodiments, the amount of metal cross-linking agent in the glass microspheres' chemical composition can be from about 10% to about 15% of the total chemical composition of a glass microsphere.

More specifically, a suitable amount of the metal cross-linking agent compound aluminum oxide ($Al_2O_3$) in the total chemical composition of a glass microsphere can be from about 3% to about 25%. In other embodiments, a suitable amount of the metal cross-linking agent compound aluminum oxide ($Al_2O_3$) in the total chemical composition of a glass microsphere can be from about 8% to about 25%. A more preferable amount of aluminum oxide ($Al_2O_3$) in the total chemical composition of a glass microsphere can be from about 5% to about 20%. An even more preferable amount of aluminum oxide ($Al_2O_3$) in the total chemical composition of a glass microsphere can be from about 9% to about 16%. In another example, a suitable amount of the metal cross-linking agent boric oxide ($B_2O_3$) in the total chemical composition of a glass microsphere can be from about 4% to about 25%. A more preferable amount of boric oxide ($B_2O_3$) in the total chemical composition of a glass microsphere can be from about 8% to about 25%. An even more preferable amount of boric oxide ($B_2O_3$) in the total chemical composition of a glass microsphere can be from about 12% to about 18%.

In some embodiments, the glass microspheres are made of aluminosilicate glass, borosilicate glass, or other type of glass that contains one or more metal cross-linking agents to enable cross-linking with the water-based polymer.

The amount of cross-linking (or increase in the composition's viscosity) is dependent on, among other things, the amount of glass microspheres present in the composition. The amount of glass microspheres can be above about 0.5% (w/v), above about 2% (w/v), above about 4% (w/v), above about 6% (w/v), above about 8% (w/v) or above about 10% (w/v) based on the total volume of aqueous base fluid. In other embodiments, the glass microspheres can be less than about 15% (w/v), less than about 10% (w/v), less than about 8% (w/v), less than about 6% (w/v), less than about 4% (w/v), less than about 2% (w/v), less than about 1% (w/v) based on the total volume of aqueous base fluid. In still other embodiments, the amount of glass microspheres in the composition can between about 0.5% (w/v) to about 15% (w/v), about 2% (w/v) to about 13% (w/v), about 4% (w/v) to about 11% (w/v) and about 6% (w/v) to about 8% (w/v) based on the total volume of aqueous base fluid.

The composition can also be essentially free of any cross-linking agent other than the glass microspheres. The term "essentially free," in this context, means that the composition does not contain another cross-linking agent, besides the glass microspheres, in an amount that would cause any substantial crosslinking of the water based polymer to occur. In other words, the composition may have trace amounts of another cross-linking agent so long as the trace amounts of the cross-linking agent do not cross-link the water-based polymer or do not substantially cross-link the water-based polymer. In some embodiments, the composition will be free of any other cross-linking agents other than those present in the chemical composition of the glass microspheres.

In some embodiments, the composition's viscosity may be reduced either naturally, or with pH adjusting agents and/or with breakers.

The composition's viscosity reduces naturally because the water-based polymer and the cross-links formed during cross-linking are natural and biodegradable. Depending on a variety of factors, such as temperature, presence of moisture, oxygen, microorganisms, enzymes, pH, and the like, the composition, excluding the glass microspheres, will degrade over time. Typically, the amount of time for the composition to degrade takes between 1 to 25 days or longer. In some embodiments, degrade time may be between 1 to 10 days and in other embodiments the degrade time can be between 1 to 5 days.

The composition's viscosity may also be reduced by adjusting the pH of the composition by adding pH-adjusting agents so that the cross-links become unstable and delink. The term "delink" as used to herein, refers to the reversible removal of cross-links between at least two molecules that are cross-linked. Generally, cross-links do not form at or below about pH 7. Suitable pH-adjusting agents used to decrease the pH level (e.g., to facilitate delinking) include, but are not limited to, fumaric acid, formic acid, acetic acid, acetic anhydride, hydrochloric acid, hydrofluoric acid, hydroxyfluoboric acid, polyaspartic acid, polysuccinimide, and combinations thereof. The appropriate pH-adjusting agent and amount thereof used will depend upon the formation characteristics and conditions known, with the benefit of this disclosure, to individuals skilled in the art.

The composition's viscosity may also be reduced by breaking down the composition by using a "breaker." Suitable breakers include certain enzymes and oxidizers. Enzyme breakers include, but are not limited to, alpha and beta amylases, amyloglucosidase, invertase, maltase, cellulase, and hemicellulase, and combinations thereof. Oxidizer breakers include, but are not limited to, sodium chlorite, sodium bromate, sodium persulfate, ammonium persulfate, encapsulated sodium persulfate, potassium persulfate, ammonium persulfate, and the like as well as magnesium peroxide. The amount and whether the breaker be encapsulated will depend upon the breaking time desired, the nature of the water-based polymer and cross-linking agent, formation characteristics and conditions, and other factors known, with the benefit of this disclosure, to individuals skilled in the art.

The compositions of the present disclosure may be used in conjunction with any suitable treatment fluid for use in treating a subterranean formation, including production and stimulation operations. These operations can include fracturing applications, preventing undesired leak-off of fluids into the formation and permanently or temporarily sealing off undesirable fluid production. The composition can be placed into the formation before or after the composition begins to cross-link.

As used herein, the "gelation time" refers to the time the composition, under particular conditions, takes to begin building viscosity. The gelation time can vary widely depending on a number of factors, including, for example, the nature of the composition and the nature of conditions the composition is subjected to.

The nature of the composition includes, for example, the nature of the water-based polymer, the nature of the cross-linking agent in the glass microsphere, and the nature of the aqueous-base fluid. The nature of the conditions include, for example, any shear conditions, pressure conditions, and the temperature conditions from the time of forming the composition to at least the time of placement in a subterranean formation. Regarding temperature conditions, the general rule, of course, is that the higher the temperature, the faster the rate of a chemical reaction, including, for example, a cross-linking reaction. Therefore, the higher the temperature conditions, the shorter the gelation time for a particular composition under otherwise identical conditions. The gelation time should be at least sufficient for desired placement of the composition into a subterranean formation before it becomes a cross-linked gel.

In some embodiments, the gelation time can be short. For example, to effectively transport and deposit proppant, the proppant must be suspended in the composition before entering the desired portion of the formation. The gelation time of the composition can also be short in order to prevent fluid loss into porous portions of the formation. The loss of fluid into the formation has an effect on the fracture size and geometry created during the operation. Thus, increasing the viscosity before the fluid enters the formation prevents the loss of fluid and the fluid's effectiveness and efficiency enhances.

In still other embodiments, the gelation time may require more time. For example, in sealing and diverting treatments, the composition forms a cross-linked gel after the fluid is pumped into a certain portion of the formation. Once located in the desired portion, the composition forms a gel and physically blocks fluid flow to divert another fluid to a more desirable location in the formation. The composition can also act as a permanent or temporary seal to stop undesirable fluid production, such as gas or water, which requires a remedial shut off operation. The composition serves to sufficiently stop the production of undesired fluids and allow the well to produce hydrocarbons.

The addition of salt may increases the viscosity of the cross-linked gel. In some embodiments, a salinity concentration can be about 0.1% (w/v) to about 20% (w/v) of the aqueous base fluid. In other embodiments the salinity concentration can be about 1% (w/v) to about 10% (w/v) of the aqueous base fluid. In other embodiments, the salinity concentration can be about 1% (w/v) to about 5% (w/v) of the aqueous base fluid. The increase in viscosity due to the addition of salt can be adjusted based upon, for example, the amount of glass microspheres or water-based polymer in the composition.

As previously indicated, the composition can be used in conjunction with a treatment fluid. The treatment fluid may contain additional additives. In other embodiments, the treatment fluid is the composition without additional additives. In use, the exemplary methods and compositions disclosed herein may directly or indirectly affect one or more components or pieces of equipment associated with the preparation, delivery, recapture, recycling, reuse, and/or disposal of the disclosed compositions.

For example, and with reference to FIG. 1, the disclosed methods and compositions may directly or indirectly affect one or more components or pieces of equipment associated with an exemplary system 10, according to one or more embodiments. In certain instances, the system 10 includes a treatment fluid producing apparatus 20, a fluid source 30, a glass microspheres' source 40, and a pump and blender system 50 that resides at the surface at a well site where a well 60 is located. In certain instances, the treatment fluid producing apparatus 20 combines the water-based polymer with the aqueous base fluid from fluid source 30. The water-based polymer hydrates to a desired viscosity range.

Once hydrated to a desired viscosity range, the pump and blender system 50 receives the hydrated polymer and combines it with the glass microspheres from the glass microspheres' source 40 and/or additional fluid/material from the additives 70. The addition of additives 70 may be additional proppant, or other additives. The additional additives may be added before or after the pump and blender system 50 receives the hydrated polymer and combines it with the glass microspheres. In other embodiments, the glass microspheres may be initially placed in a liquid, such as an aqueous base fluid, to prevent dusting. The glass microspheres can then be added to the hydrated polymer sometime after the hydrated polymer (with or without other additives 70) leaves the blender of the pump and blender system 50.

The resulting mixture (the treatment fluid, including the composition and possibly additional additives) may be pumped down the well 60 under a pressure sufficient to create or enhance one or more fractures in a subterranean zone to stimulate production of hydrocarbons from the zone and/or to prevent fluid loss. The resulting mixture may also be pumped down the well 60 for diversion and/or sealing treatments. Notably, in certain instances, the treatment fluid producing apparatus 20, fluid source 30, and/or glass microspheres' source 40 may be equipped with one or more metering devices (not shown) to control the flow of fluids, glass microspheres, and/or other additives to the pumping and blender system 50. Such metering devices may permit the pumping and blender system 50 can source from one, some or all of the different sources at a given time, and may facilitate the preparation of composition in accordance with the present disclosure using continuous mixing or "on-the-fly" methods. Thus, for example, the pumping and blender system 50 can provide just the composition into the well at some times, and in combination with other additives 70 at yet other times.

FIG. 2 shows a well 60 during a fracturing operation in a portion of a subterranean formation of interest 102 surrounding a wellbore 104. Wellbore 104 extends from a surface 106, and a treatment fluid 108 is applied to a portion of the subterranean formation 102 surrounding the horizontal portion of the wellbore. Treatment fluid 108 may be the composition of the present disclosure or may include other additives 70 in addition to the composition.

Although shown as vertical deviating to horizontal, wellbore 104 may include horizontal, vertical, slant, curved, and other types of wellbore geometries and orientations, and treatment fluid 108 may be applied to a subterranean zone surrounding any portion of the wellbore. Wellbore 104 can include a casing 110 that is cemented or otherwise secured to the wellbore wall. Wellbore 104 can be uncased or include uncased sections. Perforations can be formed in casing 110 to allow treatment fluids to flow into subterranean formation 102. In cased wells, perforations can be formed using shape charges, a perforating gun, hydro jetting and/or other tools.

Well 60 is shown with a work string 112 descending from surface 106 into wellbore 104. Pump and blender system 50 couples with work string 112 to pump treatment fluid 108 into wellbore 104. Work string 112 may include coiled tubing, jointed pipe, and/or other structures that allow fluid to flow into wellbore 104. Work string 112 can include flow control devices, bypass valves, ports, and or other tools or well devices that control a flow of fluid from the interior of work string 112 into subterranean zone 102. For example, work string 112 may include ports adjacent the wellbore wall to communicate treatment fluid 108 directly into subterranean formation 102. Work string 112 may include ports that are spaced apart from the wellbore wall to communicate treatment fluid 108 into an annulus in wellbore 104 between work string 112 and the wellbore wall.

Work string 112 and/or wellbore 104 may include one or more sets of packers 114 that seal the annulus between work string 112 and wellbore 104 to define an interval of wellbore 104 into which treatment fluid 108 will be pumped. For example purposes only, FIG. 2 shows two packers 114, one defining an up-hole boundary of the interval and one defining the down-hole end of the interval. Other embodiments may use a greater or lesser number of packers.

In some embodiments, treatment fluid 108 is introduced into one or more fractures 116 created in subterranean formation 102. After the composition, excluding the glass microspheres, degrades naturally and/or unnaturally, the glass microspheres remain to prop open the fracture. Hydrocarbons then flow into wellbore 104 and eventually are extracted from subterranean formation 102. In other embodiments, the treatment fluid 108 prevents undesired leak-off of fluids into subterranean formation 102. In still other embodiments, the treatment fluid 108 acts as a diverter and in still other embodiments the treatment fluid 108 can act to permanently or temporarily seal off undesirable fluid production.

The composition can also be made in accordance with the following methods. These methods are examples only and are not intended to limit the making of the composition to only these methods.

Method 1: In certain embodiments, making the composition includes the steps of: hydrating the water-based polymer in an aqueous base fluid of choice, such as fresh water, salt water, brine, formation brine, seawater in a blender jar; weighing out certain amount of glass microspheres depending on conditions and need; using an overhead stirrer or blender to rotationally stir the aqueous base fluid and water-based polymer; adding slowly the glass microspheres into the center of the aqueous base fluid/water-based polymer votex; allowing the glass microspheres to completely disperse; and removing fluid from the blender jar and allowing for cross-linking between water-based polymer and the glass microspheres' surface to occur.

Method 2: In other embodiments, making the composition includes the steps of: measuring out a volume of aqueous base fluid of choice; adding the aqueous base fluid to blender jar; using an overhead stirrer or blender to rotationally stir the aqueous base fluid; while mixing, adding pre-weighed glass microspheres to the center of aqueous base fluid vortex; weighing out water-based polymer; adding the water-based polymer to vortex; allowing the polymer to hydrate; remove the composition from the blender jar; and allowing cross-linking between water-based polymer and the glass microspheres' surface to occur.

EXAMPLE 1

Example 1 provides the methodology of comparing viscosities of two samples using a Fann Model 35 viscometer. Both samples were prepared as explained below and both contain the water-based polymer carboxymethylhydroxyethylcellulose (CMHEC) hydrated in seawater having about 4% (w/v) to 5% (w/v) salt content. The amount of CMHEC used in the samples was 45 lbs of CMHEC per 1000 gallons of seawater, or the scaled equivalent.

The "control" sample did not include glass microspheres while the other sample contained glass microspheres having boric oxide ($B_2O_2$) as a metal cross-linking agent. The glass microspheres used were a borosilicate glass microsphere comprised of about 12% $B_2O_2$ marketed under the trade name 3M Glass Bubbles and manufactured by 3M. The amount of glass microspheres in the other sample was 5% (w/v) based on the total volume of seawater.

The viscosity measurements of both samples were taken using the Fann Model 35 viscometer. The Fann Model 35 viscometer is a Couette rotational viscometer. When using the Fann Model 35, the sample was contained in the annular space (shear gap) between an outer cylinder and the bob (inner cylinder). Viscosity measurements were made when the outer cylinder, rotating at a known velocity, caused a viscous drag exerted by the sample. This drag created a torque on the bob, which was transmitted to a precision spring where its deflection was measured. Viscosity measured by a Fann Model 35 is a measure of the shear stress caused by a given shear rate.

The procedure used to measure the viscosity of the samples included turning the motor to the ON position at a selected speed (rpm) and reading the dial at the moment the gel breaks as noted by a peak dial reading. The viscosity of the samples is measured in centipoise (cP).

The result of the procedure demonstrated that viscosity increases due to the presence of glass microspheres with a water-based polymer. To illustrate, when the Fann Model 35 viscometer rotated the sample at 10 rpms the control sample (without glass microspheres) had a viscosity of 378 cP while the other sample (with glass microspheres) had a viscosity of 752 cP. The cross-linking that occurred due to the presence of the glass microspheres with the water-based polymer CHMEC resulted in a viscosity increase of 324 cP as compared to the control sample.

EXAMPLE 2

Example 2 also compared the viscosities of two samples using a Fann Model 35 viscometer. Both samples were prepared similarly as in Example 1 and both contained the water-based polymer carboxymethylhydroxyethylcellulose (CMHEC) hydrated in water without salt. The amount of CMHEC used in the samples was 45 lbs of CMHEC per 1000 gallons of water, or the scaled equivalent.

The "control" sample did not include glass microspheres while the other sample contained glass microspheres having boric oxide ($B_2O_2$) as a metal cross-linking agent. The glass microspheres used were a borosilicate glass microsphere comprised of about 12% $B_2O_2$ marketed under the trade name 3M Glass Bubbles and manufactured by 3M. The amount of glass microspheres in the compared sample was 5% (w/v) based on the total volume of water.

The viscosity measurements of the samples were taken using the Fann Model 35 viscometer as explained in Example 1.

The results of the procedure demonstrated that viscosity increased due to the presence of the glass microspheres even when salt is not present in the composition. To illustrate, when the Fann Model 35 rotated the control sample (without glass microspheres) at 10 rpms the control sample had a viscosity of 207 cP while the sample (with glass microspheres) had a viscosity of 684 cP. The cross-linking that occurred due to the presence of the glass microspheres with the water-based polymer CHMEC resulted in a viscosity increase of 477 cP as compared to the control sample.

The results of Examples 1 and 2 also demonstrate that the addition of salt increases viscosity. To illustrate, the use of salt increased the viscosity as between the control samples at least 171 cP. Likewise the use of salt increased the viscosity as between the samples containing glass microspheres by at least 68 cP.

EXAMPLE 3

Example 3 compared the viscosities of five samples using a Fann Model 35 viscometer. The results appear in Table 1. All samples were prepared similarly and all contain the water-based polymer carboxymethylhydroxyethylcellulose (CMHEC) hydrated in water without salt. The amount of CMHEC used in the samples was 45 lbs of CMHEC per 1000 gallons of water without salt, or the scaled equivalent.

The viscosity measurements of the samples were taken using the Fann Model 35 viscometer as in Examples 1 and 2 at 1 rpm. Each sample in Example 3 contained a differing amount of glass microspheres having boric oxide ($B_2O_2$) as a metal cross-linking agent. The glass microspheres used were a borosilicate glass microsphere comprised of about 12% $B_2O_2$ marketed under the trade name 3M Glass Bubbles and manufactured by 3M.

The results of Table 1 demonstrate that, holding all else constant, increasing the amount of glass microspheres in the composition increases the viscosity (or amount of cross-linking) in the composition.

TABLE 1

| Fluid Formulation | Viscosity (cP) |
| --- | --- |
| 0.5% by weight glass microspheres in hydrated CHMEC | 27.5 |
| 1% by weight glass microspheres in hydrated CHMEC | 30.4 |
| 2.5% by weight glass microspheres in hydrated CHMEC | 58 |
| 4% by weight glass microspheres in hydrated CHMEC | 390 |
| 10% by weight glass microspheres in hydrated CHMEC | 101456 |

In accordance with the above disclosure, several embodiments will now be described.

In the present disclosure, the composition includes an aqueous base fluid, a water-based polymer and glass microspheres. The glass microspheres each have a surface and a chemical composition comprising a metal cross-linking agent present at the surface of the glass microspheres. The water-based polymer cross-links in the presence of the glass microspheres. In other embodiments, the water-based polymer cross-links with the surfaces of the glass microspheres forming bonds (or cross-links) between the water-based polymer and the glass microspheres' surfaces.

In some embodiments, the glass microspheres can be uncoated. In other embodiments the water-based polymer only cross-link with the glass microspheres' surfaces. In still other embodiments, the composition is essentially free of any cross-linking agent other than the glass microspheres.

The composition can further include salt in the amount of about 0.1% (w/v) to about 20% (w/v), about 2% (w/v) to about 18% (w/v), about 4% (w/v) to about 16% (w/v), about 6% (w/v) to about 14% (w/v), or about 8% (w/v) to about 12% (w/v) of the aqueous base fluid. The salt increases the viscosity of the composition. In some embodiments, salt increases the viscosity of the composition by at least 50 cP, by at least 75 cP by at least 100 cP or by at least 150 cP.

In some embodiments, the cross-links formed during the cross-linking of the water-based polymer in the presence of the glass microspheres are transient and self-degrade in about 1 to about 10 days, about 2 to about 8 days or 4 to about 6 days.

In some embodiments, the metal cross-linking agent comprises at least one of the following: a boron compound, a zirconium compound, a titanium compound, an aluminum compound, an antimony compound, a chromium compound, an iron compound, a copper compound, a zinc compound, or a combination thereof.

In other embodiments, the water-based polymer can be a hydropropyl guar (HPG), carboxymethyl guar (CMG), carboxymethylhydropropyl guar (CMHPG), hydroxyethylated guar (HEG), hydroxyethylcellulose (HEC), hydroxypropylcellulose (HPC), carboxymethyl cellulose (CMC) and carboxymethylhydroxyethylcellulose (CMHEC), or a combination thereof.

In one embodiment, the water-based polymer can be carboxymethylhydroxy-ethylcellulose (CMHEC) in the amount of about 45 lbs per about 1000 gallons of the aqueous base fluid. In another embodiment, the water-based polymer can be carboxymethyl-hydroxyethylcellulose (CMHEC) in the amount of about 30 lbs per about 1000 gallons of the aqueous base fluid.

In another embodiment, the method includes:

(a) providing a composition comprising an aqueous base fluid, glass microspheres and a water-based polymer; and (b) creating a gelled fluid by cross-linking the water-based polymer in the presence of the glass microspheres such that metal ions present in the glass microspheres act as a cross-linking agent.

In another embodiment, the water-based polymer can be hydrated prior to the addition of the glass microspheres. In still another embodiment, the glass microspheres can be present in an aqueous base fluid before being added to the water-based polymer. In still a further embodiment, uses a blender system to mix the aqueous base fluid, the glass microspheres and the water-based polymer and using a pump to place the composition in a subterranean formation.

Therefore, the present invention is well adapted to attain the ends and advantages mentioned as well as those that are inherent therein. The particular embodiments disclosed herein are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values.

Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A composition comprising:
an aqueous base fluid;
a water-based polymer present in an amount from about 5 lb to about 100 lbs per 1000 gallons of the aqueous base fluid;
salt present in the amount of about 1% (w/v) to about 20% (w/v) of the total volume of the aqueous base fluid; and
glass microspheres comprising a metal cross-linking agent, wherein the glass microspheres are between about 5 to about 500 microns, the metal cross-linking agent comprises from about 8% to about 25% of the glass microsphere's chemical composition, and the glass microspheres are present in the amount of from about 0.5% (w/v) to about 15% (w/v) based on the total volume of the aqueous base fluid; and
wherein the water-based polymer cross-links in the presence of the glass microspheres and the presence of salt increases the viscosity of the composition by at least 50 cP over the viscosity of the composition in the absence of salt.

2. The composition of claim 1, wherein the composition is essentially free of any cross-linking agent other than the glass microspheres.

3. The composition of claim 1, wherein the glass microspheres are uncoated.

4. The composition of claim 1, wherein the water-based polymer only cross-links with surfaces of the glass microspheres.

5. The composition of claim 1, wherein the salt is present in the amount of about 4% (w/v) to about 5% (w/v) of the aqueous base fluid.

6. The composition of claim 1, wherein the glass microspheres are present in the amount of about 2% (w/v) to about 13% (w/v) based on the total volume of the aqueous base fluid.

7. The composition of claim 1, wherein the glass microspheres are present in the amount of at least about 3% (w/v) based on the total volume of the aqueous base fluid.

8. The composition of claim 1, wherein the glass microspheres are present in the amount of at least about 4% (w/v) based on the total volume of the aqueous base fluid.

9. The composition of claim 1, wherein crosslinks formed during the cross-linking of the water-based polymer in the presence of the glass microspheres are transient and self-degrade in about 1 to about 10 days.

10. The composition of claim 1, wherein the water-based polymer is carboxymethylhydroxyethylcellulose (CMHEC) present in the amount of about 25 lbs to about 50 lbs per about 1000 gallons of the aqueous base fluid.

11. The composition of claim 1, wherein the metal cross-linking agent comprises at least one of a boron compound, a zirconium compound, a titanium compound, an aluminum compound, an antimony compound, a chromium compound, an iron compound, a copper compound, a zinc compound, or a combination thereof.

12. The composition of claim 11, wherein the metal cross-linking agent is an aluminum compound constituting from about 9% to about 16% of the glass microspheres' chemical composition.

13. The composition of claim 12, wherein the water-based polymer comprises at least one of hydropropyl guar (HPG), carboxymethyl guar (CMG), carboxymethylhydropropyl guar (CMHPG), hydroxyethylated guar (HEG), hydroxyethylcellulose (HEC), hydroxypropylcellulose (HPC), carboxymethyl cellulose (CMC) and carboxymethylhydroxyethylcellulose (CMHEC), or a combination thereof.

14. A method comprising the steps of:
(a) providing a composition comprising an aqueous base fluid, glass microspheres comprising a metal cross-linking agent, and a water-based polymer, wherein the water-based polymer is present in an amount of from about 5 lb to about 100 lbs per 1000 gallons of the aqueous base fluid, wherein the glass microspheres are between 5 to about 500 microns and the metal cross-linking agent comprises from about 8% to about 25% of the glass microsphere's chemical composition; and
(b) creating a gelled fluid by cross-linking the water-based polymer in the presence of from about 0.5% (w/v) to about 15% (w/v) of the glass microspheres based on the total volume of the aqueous base fluid, and in the presence of about 1% (w/v) to about 20% (w/v of a salt based on the total volume of the aqueous base fluid, such that metal ions present in the glass microspheres act as a cross-linking agent and the presence of salt increases the viscosity of the composition by at least 50 cP over the viscosity of the composition in the absence of salt.

15. The method of claim 14, wherein the glass microspheres are uncoated.

16. The method of claim 14, wherein cross-links in the gelled fluid only form by a process consisting essentially of cross-linking the polymer by the metal ions present in the glass microspheres.

17. The method of claim 14, wherein the metal cross-linking agent is a boron compound constituting from about 9% to about 16% of the glass microspheres chemical composition.

18. The method of claim 14, wherein the water-based polymer is hydrated prior to the addition of the glass microspheres.

19. The method of claim 14, wherein the glass microspheres are present in the aqueous base fluid before being added to the water-based polymer.

20. The method of claim 14, further comprising using a blender system to mix the aqueous base fluid, the glass microspheres and the water-based polymer; and using a pump to place the composition in a subterranean formation.

* * * * *